United States Patent
Ziaei et al.

(10) Patent No.: US 7,297,571 B2
(45) Date of Patent: Nov. 20, 2007

(54) ELECTROSTATICALLY ACTUATED LOW RESPONSE TIME POWER COMMUTATION MICRO-SWITCHES

(75) Inventors: Afshin Ziaei, Vanves (FR); Thierry Dean, Gif sur Yvette (FR); Jean-Philippe Polizzi, Palaiseau (FR)

(73) Assignee: Thales, Neuilly-sur-Seine (FR)

( * ) Notice: Subject to any disclaimer, the term of this patent is extended or adjusted under 35 U.S.C. 154(b) by 286 days.

(21) Appl. No.: 10/529,241

(22) PCT Filed: Sep. 26, 2003

(86) PCT No.: PCT/FR03/02835

§ 371 (c)(1),
(2), (4) Date: Mar. 25, 2005

(87) PCT Pub. No.: WO2004/030005

PCT Pub. Date: Apr. 8, 2004

(65) Prior Publication Data

US 2006/0084198 A1 Apr. 20, 2006

(30) Foreign Application Priority Data

Sep. 27, 2002 (FR) .................................. 02 12007

(51) Int. Cl.
*H01L 21/00* (2006.01)
(52) U.S. Cl. ................. 438/106; 200/181; 257/E23.001
(58) Field of Classification Search ................ 200/181; 438/48, 50, 51, 106
See application file for complete search history.

(56) References Cited

U.S. PATENT DOCUMENTS 5,619,061 A * 4/1997 Goldsmith et al. ......... 257/528

(Continued)

FOREIGN PATENT DOCUMENTS

EP 0 520 407 A 12/1992

OTHER PUBLICATIONS

Liu Y et al: "High-Isolation Bst-Mems Switches" 2002 IEEE Mtt-S International Microwave Syposium Digest (IMS 2002). Seattle, WA, Jun. 2-7, 2002, IEEE MTT-S International Microwave Symposium, New York, NY vol. 1 of 3 Jun. 2, 2002, pp. 227-230.

(Continued)

*Primary Examiner*—Scott B. Geyer
*Assistant Examiner*—Reema Patel
(74) *Attorney, Agent, or Firm*—Lowe Hauptman Ham & Berner, LLP (57) ABSTRACT

The field of the invention is that of microsystems of the electrostatically actuated microswitch type that are used in electronics to carry out switching functions, especially in the microwave field for mobile telephony and radars. The object of the invention is to improve the performance of the switch by reducing the response time of the device and by increasing the radiofrequency or microwave power supported, while still maintaining low switching voltages. This improved performance is obtained by using thick membranes and by placing a material of high relative permittivity between said membrane and the associated electrode. The switch is obtained by a novel production process, the membrane being produced on an independent substrate and then joined to the base substrate of the switch. Examples of processes for producing devices according to the invention with the materials that can be used, the possible geometries and the various production steps are given.

14 Claims, 8 Drawing Sheets

U.S. PATENT DOCUMENTS

| | | | |
|---|---|---|---|
| 5,904,996 A * | 5/1999 | Van Der Zaag et al. | 428/811.2 |
| 6,143,583 A * | 11/2000 | Hays | 438/39 |
| 6,297,072 B1 * | 10/2001 | Tilmans et al. | 438/106 |
| 6,456,190 B1 * | 9/2002 | Andersson et al. | 337/365 |
| 6,486,425 B2 * | 11/2002 | Seki | 200/181 |
| 6,686,292 B1 * | 2/2004 | Yang et al. | 438/710 |

OTHER PUBLICATIONS

Database WPI Section Ch, Week 200209 Derwent Publications Ltd., London, GB; Class LO3, AN 2002-065081 May 15, 2001.

* cited by examiner

OFF STATE: V = 0

ON STATE: V = V$_C$

Section on AA

FIG. 2b

Section on BB

Section on AA

Section on BB

Section on AA

ELECTROSTATICALLY ACTUATED LOW RESPONSE TIME POWER COMMUTATION MICRO-SWITCHES

CROSS-REFERENCE TO RELATED APPLICATIONS

The present Application is based on International Application No. PCT/FR2003/002835, filed on Sep. 26, 2003, which in turn corresponds to FR 02/12007 filed on Sep. 27, 2002, and priority is hereby claimed under 35 USC § 119 based on these applications. Each of these applications are hereby incorporated by reference in their entirety into the present application.

FIELD OF THE INVENTION

The field of the invention is that of microsystem components also called MEMS (the acronym for MicroElectroMechanical Systems) and more particularly to radiofrequency or microwave microswitches incorporating a membrane that can deform under the action of an electrostatic field. The main fields of application are wireless telecommunication systems and radars.

DESCRIPTION OF THE PRIOR ART

Figure 1:
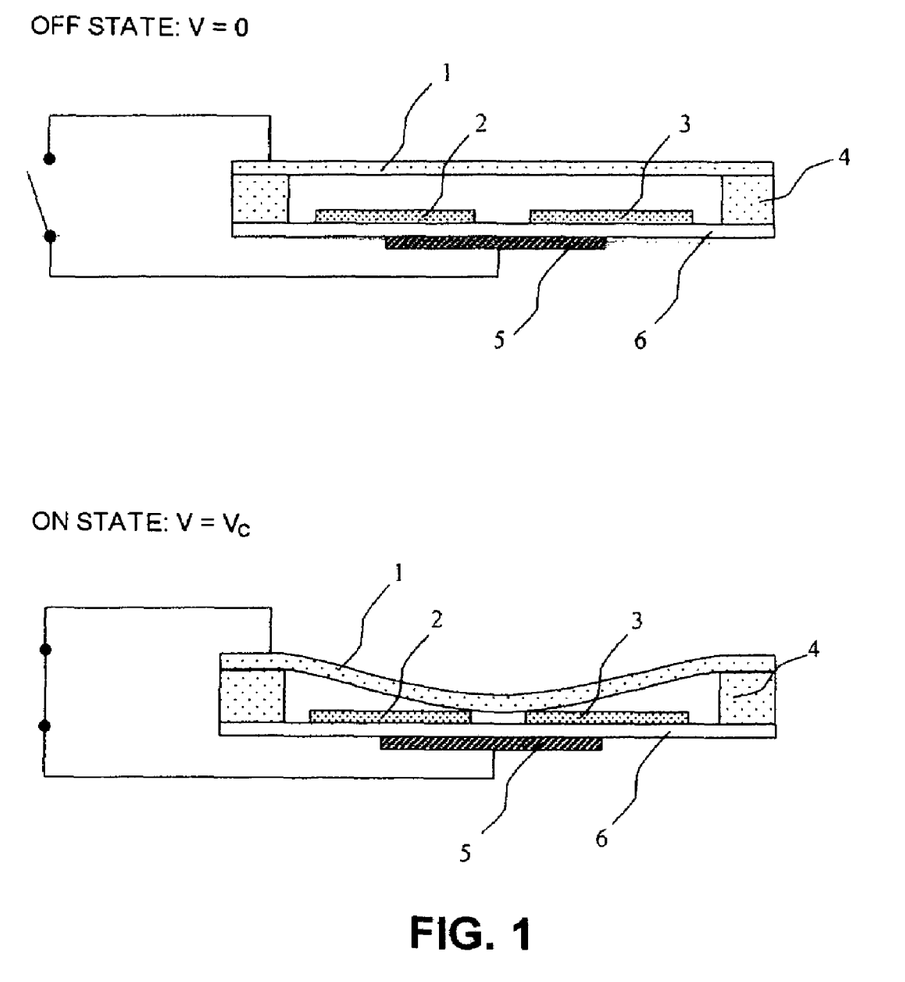
FIG. 1 shows the general operating principle of a microswitch according to the prior art, the OFF state and the ON state of the device being shown.

Microsystem components have been developed in recent years from the technologies used for producing electronic circuits. FIG. 1 shows a diagram illustrating the principle of a microswitch. A thin metal membrane or beam 1 is held suspended by supports 4 above mutually isolated conducting surfaces 2 and 3. A control electrode 5 placed beneath the conducting surfaces and optionally separated from said conducting surfaces by an insulating layer 6 completes the device. The membrane/control electrode assembly is subjected to an electrical voltage V by means of the control electrode 5. When no voltage is applied, the membrane is suspended above the conducting surfaces and there is no electrical contact between them (the OFF state). In this case, no electrical signal can pass between 2 and 3. When an increasing voltage V is applied to the membrane/electrode assembly, the membrane is subjected to an electrostatic force that deforms it until the membrane comes into contact with the conducting surfaces for a voltage $V_c$. The electrical signal then passes from 2 to 3 (the ON state). A microswitch is thus produced.

In general, radiofrequency or microwave MEMS microswitches are not used as simple switches. This is because the direct contact between the membrane and the conducting surfaces or the control electrode appreciably reduces the lifetime of the device. A dielectric layer is interposed between the surfaces and the membrane. The simple ON/OFF function is thus transformed by varying the capacitance of a capacitor, the plates of which consist of, on the one hand, the membrane and, on the other hand, the facing control electrode. The capacitance then varies from a value $C_{on}$ to a value $C_{off}$.

This type of device represents a major technical advance over conventional electronic devices operating in particular by PIN (the acronym for Positive-Intrinsic-Negative) diodes as soon as the switching rate is no longer a major parameter, that is to say as soon as the desired switching time is longer than a few microseconds.

The main advantages of this type of device are essentially:
the production techniques, which are derived from conventional electronic integrated circuit fabrication technologies. They make it possible to simplify the production and the integration, and consequently make it possible to obtain fabrication costs that are low compared with those of other technologies, while still guaranteeing high reliability;
the very low consumed electrical power levels, a few nanojoules being needed for activation;
the compactness—a microswitch is thus produced in a surface of around one tenth of a square millimetre, allowing a high integratability to be achieved; and
the microwave performance—this type of microswitch has very low insertion losses, of the order of one tenth of a decibel, well below those of devices fulfilling the same functions.

In general, the deformable upper membrane is produced by depositing one or more layers of material on a base substrate, at least one of these layers being a conducting material. These materials are those normally used in microelectronics.

The main drawback of this technique is that the deposited layers necessarily have a small thickness, the stack of layers amounting to a few microns, thereby limiting the radiofrequency power that can pass through the membrane thus produced. In addition, the small thickness of the membrane makes it relatively flexible, resulting in quite long switching times, generally of more than around 10 microseconds.

The search for faster switching speeds or greater power withstand capabilities therefore requires the use of a thicker membrane or beam 1. Unfortunately, the increased stiffness of the membrane then requires a larger force to move it, and consequently also a higher actuating voltage.

SUMMARY OF THE INVENTION

The invention proposes a novel architecture and a novel production process for obtaining a microswitch that can withstand a significant RF (radiofrequency) power and possesses a low response time, while still maintaining control voltages of around a few volts to a few tens of volts.

The device according to the invention comprises, on the one hand, a thick membrane separated by a short distance from the control electrode and, on the other hand, a dielectric layer of high dielectric permittivity, of the order of several hundred. Said device makes it possible to obtain both a better power withstand capability and a short switching time thanks to the structure of the membrane, while still maintaining normal control voltages thanks to the high permittivity of the dielectric layer. This is because a small displacement of the membrane results in relatively large variations in capacitance $C_{on}/C_{off}$. In addition, since the membrane is made of a bulk material, its mechanical reliability is superior to that of multilayer devices.

To produce this architecture, the movable membrane is produced on an independent substrate and then transferred onto the main substrate, which includes the conducting surfaces. Once assembled, it then remains to cut the substrate from the membrane in order to give it the desired shape.

More precisely, the subject of the invention is an electrostatically actuated microswitch of the capacitor type, composed of two plates, the first of which is a flexible membrane and the second of which includes at least one voltage control electrode, the two plates being separated by a thickness of vacuum or gas and at least one layer of at least one insulating material, characterized in that the flexible membrane includes at least one thick layer of bulk, the thickness of which is at least about one micron and in that at least the insulating material has a relative permittivity greater than a few tens. Advantageously, the relative permittivity of said material is greater than one hundred and said high-permittivity material is a perovskite ferroelectric such as PZT (zirconium lead titanate), BST (BaSr)TiO$_3$ or (barium strontium titanate) or PMN (lead magnesium niobate).

Advantageously, the thick layer of material of the membrane is of the SOI (silicon-on-insulator) type.

The flexible membrane is maintained above the second plate by at least one pillar. When the membrane has a single pillar, it is of the beam or cantilever type; when the membrane has at least two pillars, it is of the bridge type.

One of the main applications of this type of microswitch is its use in the microwave field. There are two main types of microswitch providing this function—the microswitches are either of the series type or of the parallel type. When the microswitches are of the series type, application of a voltage to the control electrode makes it switch from the OFF state to the ON state. When the microswitches are of the parallel type, application of a voltage to the control electrode makes it switch from the ON state to the OFF state.

In the case of a parallel-type microswitch, this comprises at least:
  an insulating substrate;
  two conducting lines located on said substrate, said lines, called ground lines, being mutually parallel and electrically connected to an electrical ground;
  a membrane comprising at least the layer of material and at least one electrically conducting layer, which is perpendicular to said ground lines, which electrically connects them together and is suspended by at least one pillar above the region located between the ground lines;
  a layer of high-permittivity dielectric;
  a conducting line, called the input signal line, placed between the ground lines, which is parallel to the ground lines and interrupted beneath the membrane;
  a conducting line called the output signal line, placed in the extension of the input signal line and between the ground lines, which is parallel to said ground lines and interrupted beneath the membrane; and
  a control electrode located on said substrate, one of the ends of which, placed beneath the membrane, electrically connects the input signal line to the output signal line.

In the case of a series-type microswitch, this comprises at least:
  an insulating substrate;
  a layer of high-permittivity dielectric;
  a membrane comprising at least the layer of material and at least one electrically conducting layer that is suspended above the insulating substrate by at least one pillar;
  a conducting line called the input signal line, interrupted beneath the membrane;
  a conducting line called the output signal line, placed in the extension of the input signal line, interrupted beneath the membrane; and
  a control electrode located on said substrate, one of the ends of which, placed beneath the substrate, is located between the input signal line and the output signal line.

In a first embodiment of the microswitch, the layer of high-permittivity dielectric is placed on the membrane facing the insulating substrate. Of course, it is also possible to deposit said layer on the conducting lines located on the insulating substrate.

Advantageously, the insulating substrate having the conducting lines is made of silicon covered with an insulating layer of silica, glass or gallium arsenide; the control electrode is made of a titanium-tungsten alloy and said electrode may be covered with an insulating material, which may be silicon nitride or silicon oxide.

Preferably, the various conducting lines are produced by depositing gold and said conducting lines have a common width of about fifty microns. In the case of a parallel-type microswitch, the ground lines are separated from one another by about one hundred and fifty microns.

Advantageously, the membrane comprises at least one layer made of a titanium, platinum, tungsten, aluminum or gold alloy, the high-permittivity layer has a thickness of about one micron, the membrane is separated from the second plate of the condenser in the OFF state by a vacuum or gas with a thickness of about one micron, and the general shape of the membrane is a rectangular parallelepiped. This general shape may have several variants, in order to improve the performance of the device or its reliability.

Advantageously, the length of the parallelepiped is about one hundred microns, its width is about three hundred microns and its thickness a few microns.

Advantageously, the process for producing the microswitch comprises at least the following steps:
  production of a first subassembly comprising a first substrate and at least conducting lines and a control electrode;
  production of a second subassembly comprising at least the thick layer of material constituting the final membrane, at least the electrically conducting layer and at least the high-permittivity layer;
  mechanical and electrical assembly of the two subassemblies; and
  elimination of the second substrate down to the stop layer; and
  final cutting of the second subassembly to the dimensions of the membrane by photolithography and etching.

Advantageously, the high-permittivity layer is deposited by a sputtering or sol-gel process.

There are several possible ways of implementing said production process.

In a first method of implementation, the first substrate of the first subassembly has regions of additional thickness, called mesas, and an insulating layer, each mesa being covered with a thickness of metal identical to that of the conducting lines, and the conducting layer of the second subassembly has, facing the mesas, regions of additional thickness that are produced in the same material as the high-permittivity layer and have the same thickness. These mesas are intended to serve as spacers when bonding the two substrates together and their height allows the distance between the control electrode of the device and the high-permittivity dielectric layer to be adjusted.

The two subassemblies are joined together by depositing and bonding a eutectic alloy. In the case of a parallel-type microswitch, this alloy is deposited between the ground lines of the first subassembly and the conducting lines of the second subassembly, the regions of additional thickness of the second subassembly then resting on the mesas of the first subassembly. The eutectic alloy may be of the gold/tin type. During the cutting operation, the membrane is released from said mesas, which no longer have a functional utility.

In a second method of implementation, deformable metal is deposited on certain regions of the first subassembly. In the case of a parallel-type microswitch, these regions are located on the ground lines of the first subassembly. Said deformable material is either gold or a gold/tin eutectic alloy. In this case, the production of the second subassembly then comprises the following substeps:

production of the second subassembly, which comprises the first substrate, at least one stop layer and the layer of material constituting the final membrane;

localized etching of said subassembly so as to create at least one pillar; and deposition of at least the electrically conducting layer and of at least the high-permittivity layer on the etched part.

The two subassemblies are joined together by anodic bonding of the two subassemblies at the etched pillar or pillars. The two subassemblies are then electrically connected together at the locally deposited deformable metal regions.

In this second method of implementation, the first substrate is preferably made of glass.

Except for special applications, the microswitches are produced collectively. From the industrial standpoint, to reduce the costs and to make the final characteristics of the microswitches uniform, a plurality of components are produced simultaneously, using wafer-based collective production technologies. In this case, a first plurality of subassemblies, which include the conducting lines, is produced on a first wafer, a second plurality of subassemblies, including the membranes, is produced on a second wafer, and the two wafers are then joined together and the assembly obtained is then cut in order to obtain a plurality of microswitches.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be more clearly understood and further advantages will appear on reading the description that follows, given by way of nonlimiting example and thanks to the appended figures in which:

FIGS. 3, 4, 5 and 6 show the various steps of the process for producing a parallel-type microswitch according to a first embodiment;

FIGS. 7, 8 and 9 show the various steps of the process for producing a parallel-type microswitch according to a second embodiment;

DETAILED DESCRIPTION OF THE INVENTION

Figure 2A:
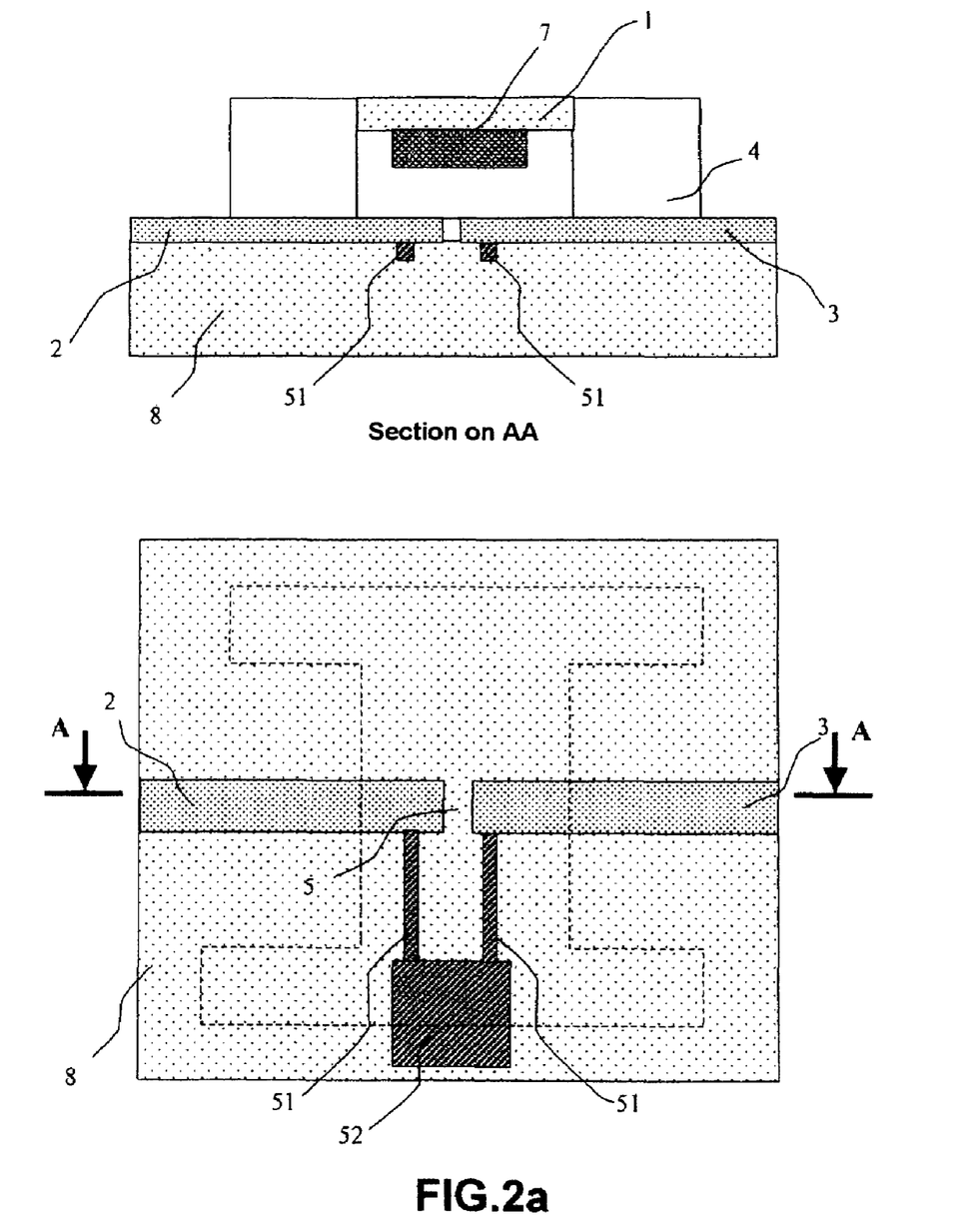
FIG. 2a shows the general arrangement of the device according to the invention in the OFF state in the case of a series-type microswitch.

FIG. 2a shows a sectional view and a top view illustrating the principle of the device according to the invention in the case of a series-type microswitch. In the top view, and for the sake of clarity, only the outline of the membrane is shown in dotted lines. A thick metal membrane or beam 1 is held suspended by supports 4 above a first conducting line 2, called the input line, and above a second conducting line 3, called the output line, these lines being isolated from each other and placed on an insulating substrate 8. This membrane includes a layer 7 of high permittivity material. Two resistive lines 51 are connected to a voltage control pad 52. These lines 51 are sufficiently resistive to prevent propagation of the RF signal. The ends of the lines 51 located beneath the membrane are connected to the control electrode 5. A capacitor is thus formed, the plates of which are, on the one hand, the membrane and, on the other hand, the facing control electrode 5. When the control electrode 5 does not generate a voltage beneath the membrane, the latter is at rest. The capacitance of the capacitor is then about ten femtofarads. This very low capacitance induces a large enough impedance between the two conducting lines for no signal to be able to pass from one line to the other. The microswitch is open.

When an increasing voltage is applied to the membrane/ electrode assembly, the membrane 1 is subjected to an electrostatic force that deforms it slightly until the layer 7 of high permittivity material comes into contact with the conducting lines 2 and 3. The capacitance of the capacitor, the plates of which are formed by the membrane and the control electrode, increases by a factor of about one hundred. This capacitance, which is maintained at around one picofarad induces a sufficiently low impedance between the two lines for the signal to be able to pass from the input line to the output line. The microswitch is closed.

Figure 2B:
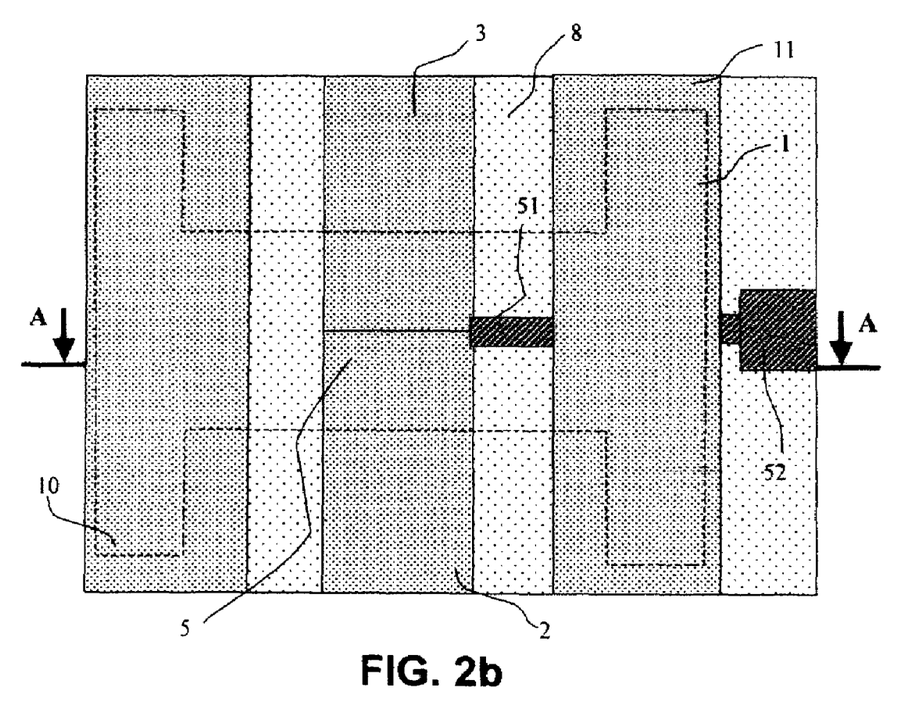
FIG. 2b shows the general arrangement of the device according to the invention in the ON state in the case of a parallel-type microswitch.

FIG. 2b shows a sectional view and a top view illustrating the principle of the device according to the invention in the case of a parallel-type microswitch. In the top view and for the sake of clarity, only the outline of the membrane is shown in dotted lines. A thick metal membrane or beam 1 is held suspended by supports 4 above a first conducting line 2, called the input line, and above a second conducting line 3, called the output line, these being placed in the extension of each other on an insulating support 8. This substrate also includes two conducting lines 10 and 11 which are parallel to each other and placed on either side of the conducting lines 2 and 3. Said lines 10 and 11 are electrically connected together and connected to an electrical ground. This membrane includes a layer 7 of high permittivity material. A control electrode 5 is located beneath the facing parts of the lines 2 and 3. This electrode 5 is connected to a voltage control pad 52 via a line 51 that is sufficiently resistive to prevent propagation of the RF signal. Thus, a capacitor is produced whose plates are, on the one hand, the membrane and, on the other hand, the facing control electrode 5. When the control electrode 5 does not generate a voltage beneath the membrane, the latter is at rest. The capacitance of the capacitor formed is low and does not disturb the passage of the signal from the line 2 to the line 3, the switch being in the on state. When the control electrode generates a voltage sufficient to lower the membrane, the capacitance induces a low enough impedance to short-circuit the signal from the line 2 to the ground lines 10 and 11. The output line 3 of the device is then isolated from the input line 2.

FIGS. 3 to 9 show the various steps of the processes for producing microswitches in the case in which the microswitches are of the parallel type. These processes also apply in the case of series-type switches, which differ from the previous ones simply by the arrangement of the conducting lines, as shown in FIGS. 2a and 2b.

FIGS. 3, 4, 5 and 6 show the various steps of the process for producing the parallel-type microswitch according to a first embodiment.

Figure 3:
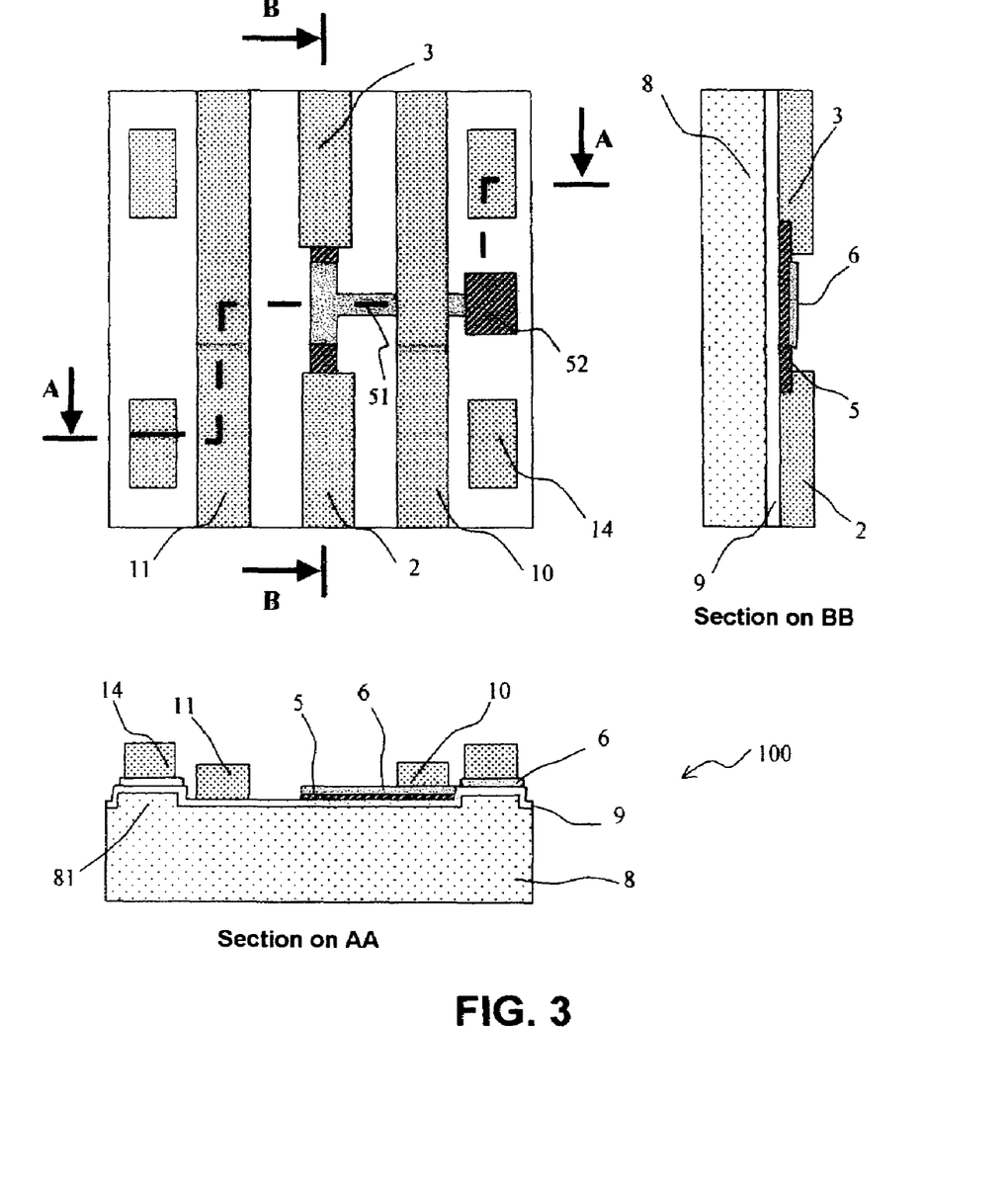
FIG. 3 shows three views of the first subassembly before they are joined together.

FIG. 3 shows a top view and two sectional views on AA and BB of the first subassembly 100 before assembly. The process for fabricating the first subassembly typically comprises the following steps:

production on an insulating substrate 8, for example made of insulating silicon or glass, of regions 81 of additional thickness, called mesas, by etching said substrate;

production of a layer 9 of insulating material of the silica type on the surface of the substrate 8, which includes the mesas if the substrate is not sufficiently insulating. This layer may be obtained by deposition or by surface oxidation of the substrate, especially in the case of a silicon substrate;

simultaneous production of the control lines 51, the control pad 52 and the control electrode 5. This control electrode may optionally be covered by the input and output signal lines 2 and 3. The control lines 51 are sufficiently resistive to prevent the propagation of the RF signal. Typically, this resistance is greater than one hundred ohms/square;

deposition of a layer 6 of insulating material of the silicon nitride or silicon oxide type on the lines 51, and optionally the electrode 5 and the mesas 81;

simultaneous production of:

two conducting lines 10 and 11 implanted on said substrate 8, called the ground lines, which are mutually parallel and electrically connected to an electrical ground. The two conducting lines are produced typically by deposition of gold. Their width is about fifty microns and the distance separating them is about one hundred and fifty microns;

two conducting lines 2 and 3 placed between the ground lines 10 and 11, these being parallel to said ground lines, in the extension of each other. Depending on the arrangement chosen, these lines may be in direct mutual contact, and they then cover the electrode 5, or are electrically connected by means of the electrode 5 as indicted in FIG. 3. The first of these lines is called the input signal line and the second of these lines is called the output signal line; and layers 14 of metal of the same type and the same thickness as that of the conducting layers, these being deposited on the mesas that have been created beforehand.

Figure 4:
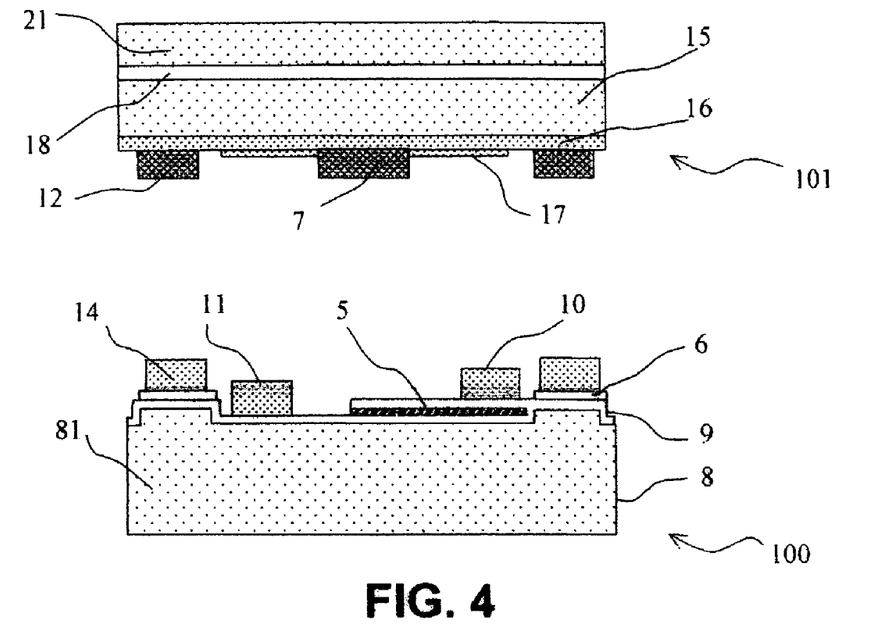
FIG. 4 shows a sectional view of the two subassemblies before they are joined together.

FIG. 4 shows a sectional view of the two subassemblies before they are joined together. The process for fabricating the second subassembly 101 typically comprises the following steps:

production of an assembly comprising a second substrate 21, at least one stop layer 18 and the layer of material 15 serving as base for the production of the membrane, preferably of the SOI (silicon on insulator) type;

deposition on said material 15 of a layer 16 intended to produce the upper electrode of the device. This layer may be made of a titanium or platinum alloy;

deposition of a layer 7 of high-permittivity dielectric, placed on the electrode produced beforehand. This layer typically has a thickness of around one micron. It is etched in such a way that the region covered with the dielectric is placed facing the electrode 5. This layer 12 is also deposited on the facing regions of the mesas; and optionally, a second metal layer 17 is deposited on the first layer 16 in order to reduce the series resistance of the conductor thus produced.

Figure 5:
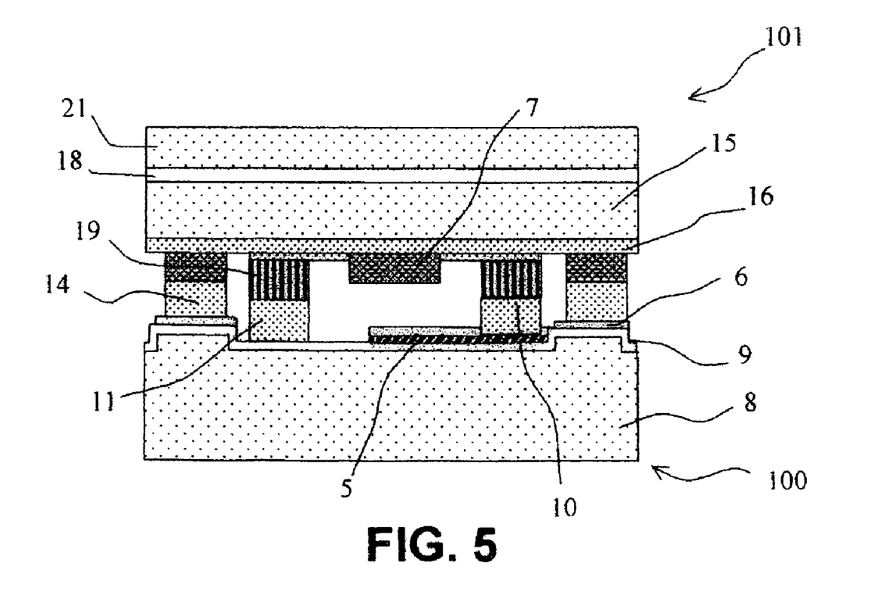
FIG. 5 shows a sectional view of the same two subassemblies before they are joined together.

FIG. 5 shows a sectional view of the same two subassemblies before they are joined together by bonding. The bonding is of the eutectic type: a layer 19 of eutectic alloy, for example of the Sn/Au type, is deposited on the conducting lines 10 and 11 at the places where the bonding has to take place. During this operation, the alloy layer 19 electrically and mechanically connects the ground lines to the electrode 16 of the subassembly 101. The distance between the two subassemblies 100 and 101 is determined by the stacking of materials on the mesas that serve as mechanical stop layer. In the end, the distance between the control electrode 5 and the dielectric layer 7 is equal to the height of the mesas 81. It should be noted that the alloy layer 19, which is soft during the bonding operation, does not disturb the distance between the control electrode 5 and the dielectric layer 7. This process makes it possible for the distance that determines the control voltage of the device to be precisely controlled.

Figure 6:
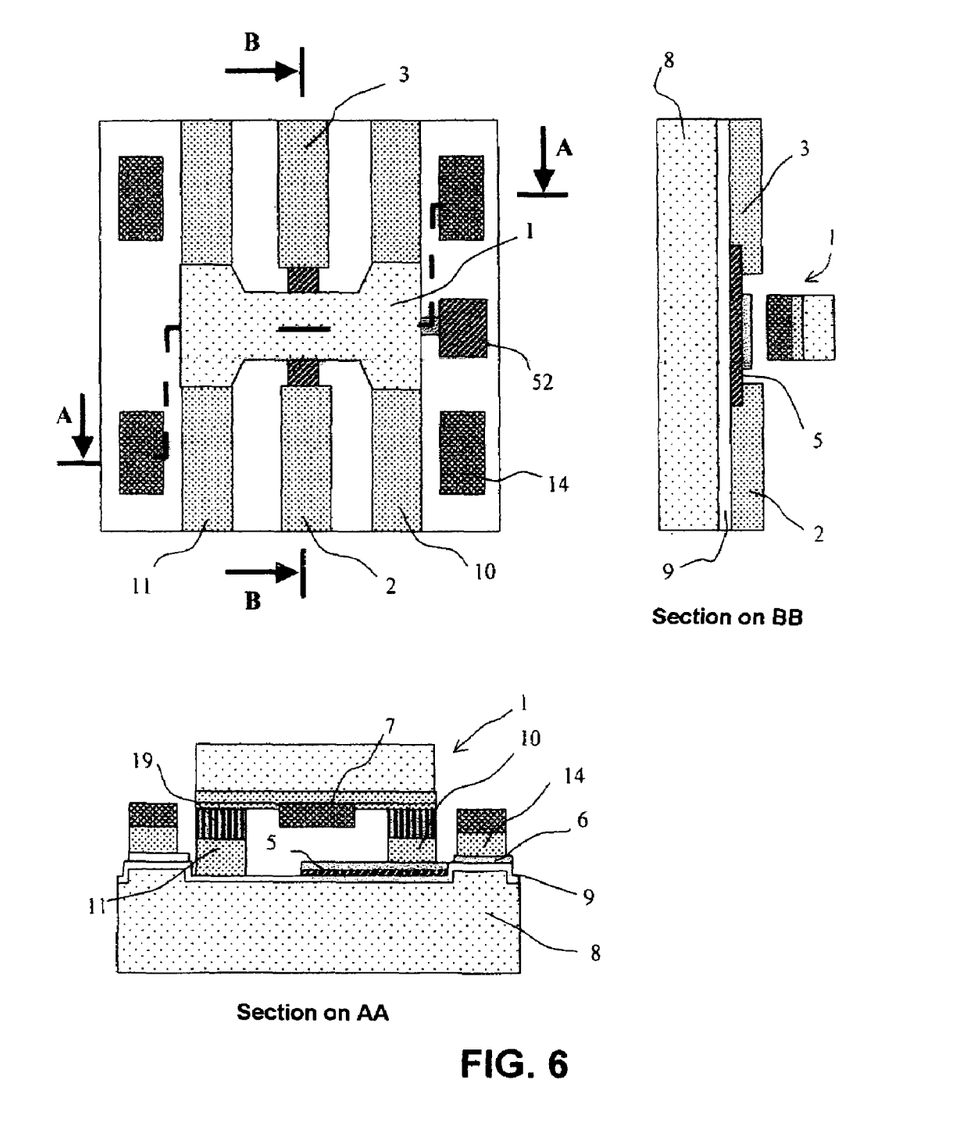
FIG. 6 shows three views of the microswitch after assembly and final cutting.

FIG. 6 shows three views of the microswitch after assembly and final cutting. The following cutting operations have been carried out:

removal of the substrate 21 down to the buried silica layer 18. The resulting thickness of the upper silicon wafer is then around 2 to 10 microns. The final geometry of the membrane is then defined by photolithography and etching of the silicon; and optional removal of the part comprising the mesas 81, which have no function after ensuring separation of the two subassemblies during fabrication of the devices.

Figure 7:
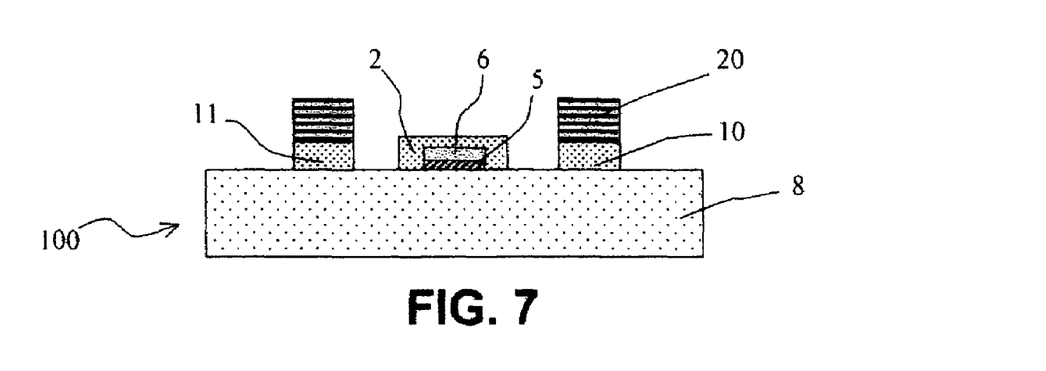
FIG. 7 shows a view of the first subassembly before assembly.
Figure 8:
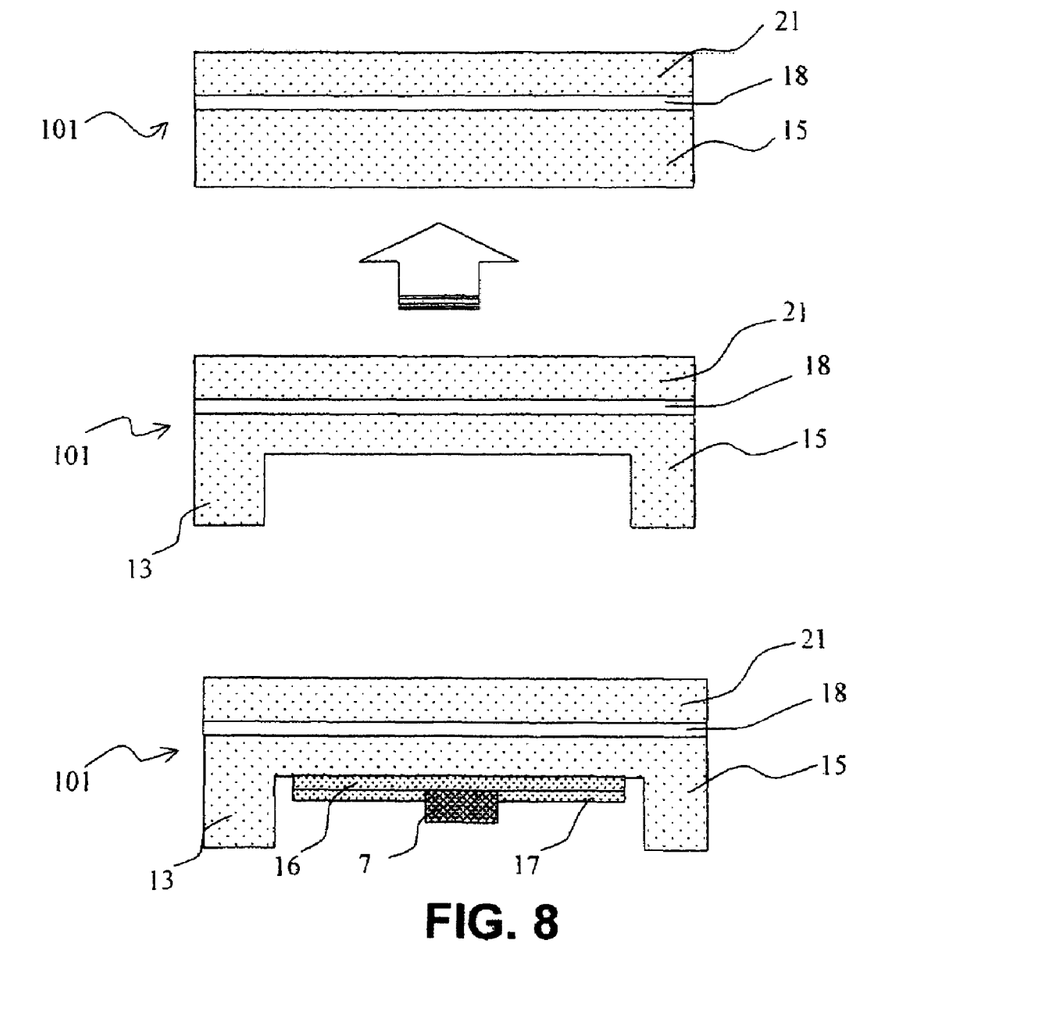
FIG. 8 shows the three main steps of the process for producing the second subassembly.
Figure 9:
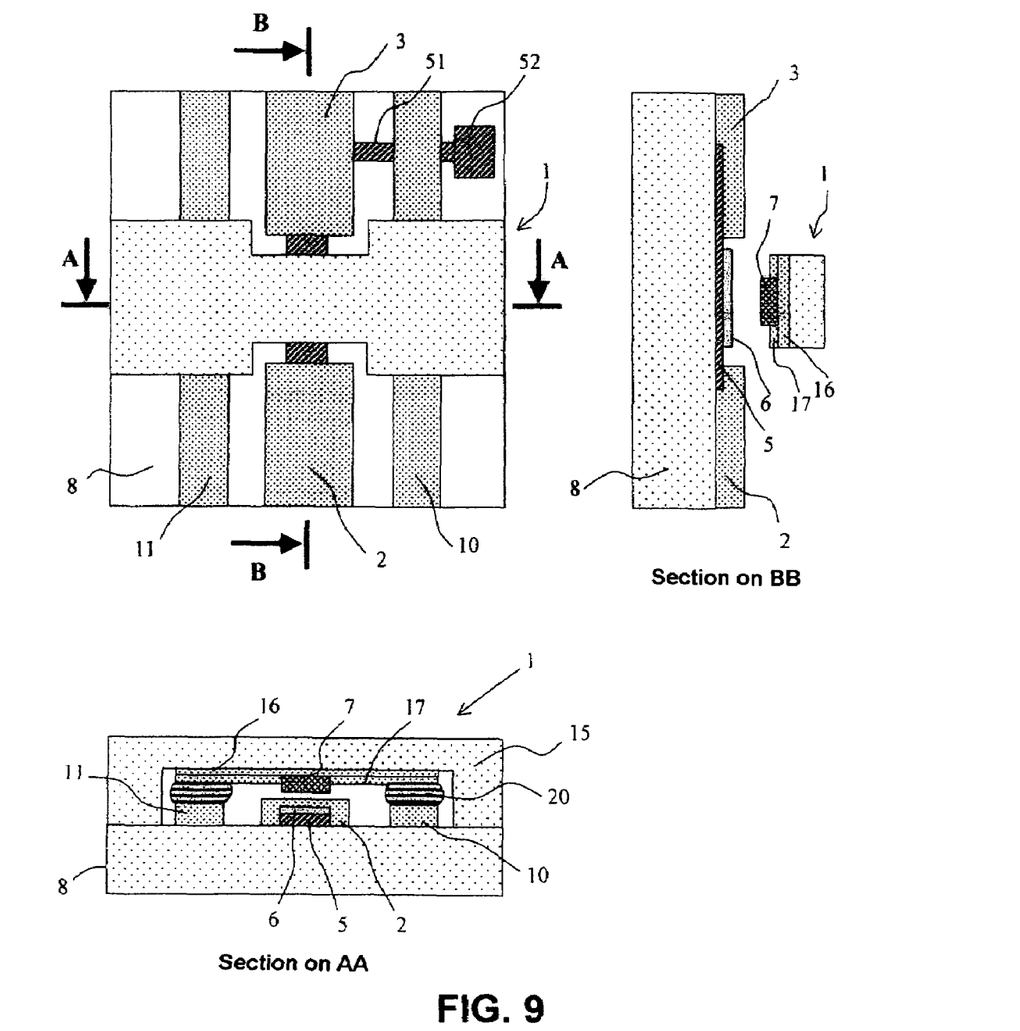
FIG. 9 shows three views of the microswitch after assembly and final cutting.

FIGS. 7, 8 and 9 show the various steps of the process for producing a parallel-type microswitch in a second embodiment.

FIG. 7 shows a sectional view of the first subassembly 100 before assembly. The process for fabricating said first subassembly typically comprises the following steps:

simultaneous production of the control line 51, the control pad 52 and the control electrode 5. This control electrode may optionally be covered by the input and output signal lines 2 and 3. The control line 51 is sufficiently resistive to prevent the propagation of the RF signal. Typically, this resistance is greater than one hundred ohms/square;

deposition of a layer 6 of insulating material of the silicon nitride or silicon oxide type, covering the lines 51 and, optionally, partly the electrode 5; and simultaneous production of:

two conducting lines 10 and 11 implanted on said substrate 8, these being called ground lines, which are mutually parallel and electrically connected to an electrical ground. The two conducting lines are typically produced by depositing gold. Their width is about fifty microns and the distance separating them about one hundred and fifty microns, two conducting lines 2 and 3 placed between the ground lines 10 and 11, these being parallel to said ground lines, one along the extension of the other. Depending on the arrangement chosen, these lines may be in direct contact with one another (they then cover the electrode 5), or are electrically connected by means of the electrode 5. The first of these lines is called the input signal line and the second of these lines is called the output signal line; and electrolytic deposition of a deformable metal 20 on that part of the lines 10 and 11 facing the upper electrode. This metal may be a eutectic of the Au/Sn type or simply gold. This material is deformed during the process of bonding the two subassemblies together.

FIG. 8 shows a sectional view of the second subassembly 101 before assembly. The process for fabricating the second subassembly typically comprises the following steps:

production of an assembly comprising a second substrate 21 and at least one stop layer 18, the layer of material 15 serving as base for the production of the membrane, preferably of the SOI (silicon on insulator) type;

etching of the second substrate 15 so as to produce the pillars for attaching the membrane;

deposition of a metal layer 16, for example made of Ti/Pt, intended to produce the upper electrode of the device; and deposition of a layer of high-permittivity dielectric 7 placed on the electrode produced beforehand. This layer typically has a thickness of the order of 1 micron. Optionally, a second metal layer 17 is deposited on the first, in order to reduce the series resistance of the conductor thus produced.

FIG. 9 shows a top view and two mutually perpendicular sectional views on AA and BB of the finalized microswitch after assembly. The assembly and finishing process comprises the following steps:

bonding of the two subassembly by anodic bonding, the bonding being at the pillars. During this operation, the metal 20 provides the electrical connection between the ground lines and the electrode 16 of the membrane, which is slightly flattened. The distance between the membrane and the control electrode is then defined by the depth of etching of the pillars; and removal of the substrate 21 down to the buried silica layer 18. The resulting thickness of the upper silicon wafer is then around 2 to 10 microns. The final geometry of the membrane is then defined by photolithography and etching of the silicon.

In the two production processes presented, the shape of the movable electrode was located merely by way of example. Other (round, rectangular, etc.) shapes and a variety of attachment points (two anchoring points, as indicated in the figures, a single anchoring point for membranes of the cantilever beam type, or any number of points, etc.) are possible. A membrane of more complex shape may also be produced, for example a membrane for switching several signal lines simultaneously so as to form devices of the single pole/single throw, single pole/double throw or multiple pole/multiple throw type.

The major difference between the two processes is that, in the case of the second process, the region of bonding between the two subassemblies provides only the mechanical connection, the electrical connection being formed in the regions where the metal 20 is deposited. The main advantage of this method is that the anodic bonding allows a stronger connection to be obtained.

Whatever the production process, the operating principle of the parallel-type microswitch is the following:

When the control electrode 5 generates no voltage beneath the membrane, the latter is at rest. The capacitance $C_{off}$ of the capacitor, the plates of which are formed by the membrane and the control electrode, is then around ten femtofarads. This very low capacitance has no influence on the transmission of the signal between the lines 2 and 3 connected to the electrode 5. The switch is closed.

When the control electrode 5 generates a sufficient voltage beneath the membrane, the latter deforms and the dielectric layer 7 placed on its lower part comes into contact with the control electrode 5. The capacitance $C_{on}$ of the capacitor, the plates of which are formed by the membrane and the control electrode, increases by a factor of about one hundred. This capacitance, which is now of the order of one picofarad, induces a low enough impedance for the signal to be short-circuited to ground. The signal then flows from the inlet line 2 to the ground lines 10 and 11 through the membrane. The input and output lines 2 and 3 are then isolated.

The use of a material 7 of high dielectric permittivity allows the very high $C_{on}/C_{off}$ ratio to be maintained, while still having a very small gap between the two electrodes. This permits a relatively low control voltage, from a few volts to a few tens of volts, to be used.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A process for producing a microswitch, comprising at least the following steps:

producing a first subassembly having a first substrate and at least conducting lines and a control electrode, the substrate having regions of additional thickness, called mesas, and a second conducting layer, each mesa being covered with a thickness of metal identical to that of the conducting lines;

producing a second subassembly having a second substrate, at least one stop layer, a layer of material, at least one electrically conducting layer and at least one high-permittivity layer;

assembling the two subassemblies mechanical and electrical;

eliminating the second substrate down to the stop layer; and final cutting of the layer to the dimensions of a membrane by photolithography and etching.

2. The process for producing a microswitch as claimed in claim 1, wherein the high-permittivity layer is deposited by a sputtering or sol-gel process.

3. The process for producing a microswitch as claimed in claim 1, wherein the conducting layer has, facing the mesas, regions of additional thickness that are produced in the same material as the layer and have the same thickness.

4. The process for producing a microswitch as claimed in claim 1, wherein, for a parallel-type microswitch comprising, on the first subassembly, two conducting lines located on the insulating substrate, which are mutually parallel and electrically connected to an electrical ground; a conducting line, called the input signal line which is placed between the ground lines and is parallel to said ground lines; a conducting line called the output signal line which is placed in the extension of the input signal line and between the ground lines, which is parallel to said ground lines and a control electrode located on said substrate, one of the ends of which electrically connects the input signal line and the output signal line, and the two subassemblies are joined together by the deposition and bonding of a eutectic alloy between the ground lines and the conducting layers, the regions of additional thickness resting on the mesas.

5. The process for producing a microswitch as claimed in claim 4, wherein the eutectic alloy is of the gold/tin type.

6. The process for producing a microswitch as claimed in claim 1, wherein at least one deposition of deformable metal is carried out on the first subassembly.

7. The process for producing a microswitch as claimed in claim 6, wherein the deformable material is either gold or a gold/tin eutectic alloy.

8. The process for producing a microswitch as claimed in claim 6, wherein the production of the second subassembly comprises the following substeps:
   producing an assembly having the first substrate, at least the stop layer and the layer of material;
   cutting of the layer so as to create at least one pillar; and
   deposition of the electrically conducting layer and at least the layer on the layer.

9. The process for producing a microswitch as claimed in claim 6, wherein the second subassembly is joined to the first subassembly by anodic bonding at its pillar or pillars.

10. The process for producing a microswitch as claimed in claim 6, wherein in the case of a parallel-type switch, the electrical connection between the ground lines and the conducting layers is produced by means of the deposit or deposits of metal.

11. The process for producing a plurality of microswitches as claimed in claim 1, wherein a plurality of subassemblies are produced on a common substrate and a plurality of subassemblies are produced on a common substrate, the joining operation being common to the two subassemblies, the whole assembly obtained then being cut in order to obtain a plurality of individual microswitches.

12. The process for producing a microswitch as claimed in claim 7, wherein in the case of a parallel-type switch, the electrical connection between the ground lines and the conducting layers is produced by means of the deposit or deposits of metal.

13. The process for producing a microswitch as claimed in claim 8, wherein in the case of a parallel-type switch, the electrical connection between the ground lines and the conducting layers is produced by means of the deposit or deposits of metal.

14. The process for producing a microswitch as claimed in claim 9, wherein in the case of a parallel-type switch, the electrical connection between the ground lines and the conducting layers is produced by means of the deposit or deposits of metal.

* * * * *